(12) United States Patent
Zalan

(10) Patent No.: US 9,278,607 B2
(45) Date of Patent: Mar. 8, 2016

(54) AIR OUTLET DIRECTIONAL FLOW CONTROLLER WITH INTEGRATED SHUT-OFF DOOR

(75) Inventor: Daryl Zalan, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 975 days.

(21) Appl. No.: 13/466,159

(22) Filed: May 8, 2012

(65) Prior Publication Data

US 2013/0078900 A1  Mar. 28, 2013

Related U.S. Application Data

(60) Provisional application No. 61/538,964, filed on Sep. 26, 2011.

(51) Int. Cl.
*B60H 1/34* (2006.01)

(52) U.S. Cl.
CPC ...... *B60H 1/3421* (2013.01); *B60H 2001/3478* (2013.01)

(58) Field of Classification Search
USPC .................................. 454/152, 155
IPC ...................... B60H 1/3421,2001/3478, 1/3428
See application file for complete search history.

(56) References Cited

U.S. PATENT DOCUMENTS

| 7,455,581 B2* | 11/2008 | Gehring et al. ............... 454/155 |
| 2004/0127153 A1* | 7/2004 | Demerath ..................... 454/155 |
| 2011/0296855 A1 | 12/2011 | Johnston et al. |
| 2012/0168125 A1 | 7/2012 | Johnston et al. |

FOREIGN PATENT DOCUMENTS

FR       2844484 A1 *  3/2004

OTHER PUBLICATIONS

English translation of the Abstract of the FR 2844484A1.*

\* cited by examiner

*Primary Examiner* — Steven B McAllister
*Assistant Examiner* — Helena Kosanovic
(74) *Attorney, Agent, or Firm* — J. Richard Soderberg

(57) ABSTRACT

A vehicle air vent is provided that includes a plurality of air control vanes, the orientation of which determines the direction of air flow exiting the air vent; a shut-off door that allows air to flow through the air vent when it is in a first position and blocks air flow through the air vent when it is in a second position; a control tab mechanically coupled to the plurality of air control vanes; and a linkage assembly mechanically coupling the control tab to the shut-off door. Adjustment of the control tab within a first range of positions controls the orientation of the air control vanes while maintaining the shut-off door in an open position. Adjustment of the control tab within a second range of positions, however, moves the shut-off door between the first and second positions, thereby controlling air flow through the air vent.

21 Claims, 11 Drawing Sheets

AIR OUTLET DIRECTIONAL FLOW CONTROLLER WITH INTEGRATED SHUT-OFF DOOR

CROSS-REFERENCE TO RELATED APPLICATION

This application claims the benefit of the filing date of U.S. Provisional Patent Application Ser. No. 61/538,964, filed 26 Sep. 2011, the disclosure of which is incorporated herein by reference for any and all purposes.

FIELD OF THE INVENTION

The present invention relates generally to air vents and, more particularly, to a multi-function air vent controller for use in the HVAC system of a vehicle.

BACKGROUND OF THE INVENTION

The air outlet in a conventional vehicle utilizes a pair of mechanical control mechanisms. The first control mechanism, for example a tab mounted to the air flow control vanes, is used to control the direction of air flow through the air outlet. A second and separate control mechanism, for example a rotating wheel, is used to open or shut-off air flow through the air outlet using an auxiliary door.

Accordingly, what is needed is a simplified air flow controller for use with a vehicle air outlet. The present invention provides such a controller.

SUMMARY OF THE INVENTION

A vehicle air vent is provided that includes a plurality of air control vanes, the orientation of which determines the direction of air flow exiting the air vent; a shut-off door that allows air to flow through the air vent when it is in a first position and blocks air flow through the air vent when it is in a second position; a control tab mechanically coupled to the plurality of air control vanes; and a linkage assembly mechanically coupling the control tab to the shut-off door. When the control tab is adjusted within a first range of positions, the orientation of the plurality of air control vanes is altered and the shut-off door remains within the first position, thereby allowing air to flow through the vent. Adjustment of the control tab within a second range of positions, however, moves the shut-off door between the first and second positions, thus allowing air flow through the air vent to be controlled.

In at least one embodiment, the plurality of air control vanes is comprised of a plurality of horizontal air control vanes that determine the up/down direction of air flow exiting the air vent, and a plurality of vertical air control vanes that determine the left/right direction of air flow exiting the air vent. In one aspect, the control tab may be adjusted from side to side, wherein if the control tab is adjusted side to side within the first range of positions the orientation of the plurality of vertical air control vents is varied while the shut-off door remains within the first position (e.g., open). If the control tab is adjusted side to side within the second range of positions, the position of the shut-off door may be altered between the first position (e.g., open) and the second position (e.g., closed). In another aspect, the control tab may be adjusted upwards and downwards from a central position, wherein if the control tab is adjusted upwards or downwards while remaining within the first range of positions, the orientation of the plurality of horizontal air control vents is varied and the shut-off door remains within the first position (e.g., open). A first control rod may be used to couple the plurality of horizontal air control vanes together so that they move in unison and a second control rod may be used to couple the plurality of vertical air control vanes together so that they move in unison. The control tab may be mounted to a primary vertical air control vane with a flexible joint assembly. The control tab may include a slot configured such that the control tab slides over a portion of a primary horizontal control vane during side to side tab adjustment.

In at least one embodiment, the linkage assembly includes a cam. The cam includes a slot, the slot having a first portion that is concentric about the cam rotation axis and a second portion that is not concentric about the cam rotation axis. The linkage assembly may further include a first link with a pin that is captured within the cam slot, where the first link is coupled to the shut-off door via at least a second link and a third link, and where rotation of the third link about a third link axis causes the shut-off door to move between the first position (e.g., open) and the second position (e.g., closed). In one aspect, during adjustment of the control tab within the first range of positions the pin on the first link remains within the first portion of the cam slot and the third link does not rotate about the third link pivot axis, and during adjustment of the control tab within the second range of positions the pin on the first link moves within the second portion of the cam slot causing the third link to rotate about the third link pivot axis. In another aspect, during adjustment of the control tab within the first range of positions the cam rotates about the cam rotation axis within a first range of rotation and the pin on the first link remains within the first portion of the cam slot and the third link does not rotate about the third link pivot axis, and during adjustment of the control tab within the second range of positions the cam rotates about the cam rotation axis within a second range of rotation and the pin on the first link moves within the second portion of the cam slot causing the third link to rotate about the third link pivot axis.

Exemplary forms for the control tab include (i) a planar, elongated form, and (ii) a knob-like form.

A further understanding of the nature and advantages of the present invention may be realized by reference to the remaining portions of the specification and the drawings.

DESCRIPTION OF THE SPECIFIC EMBODIMENTS

Figure 1:
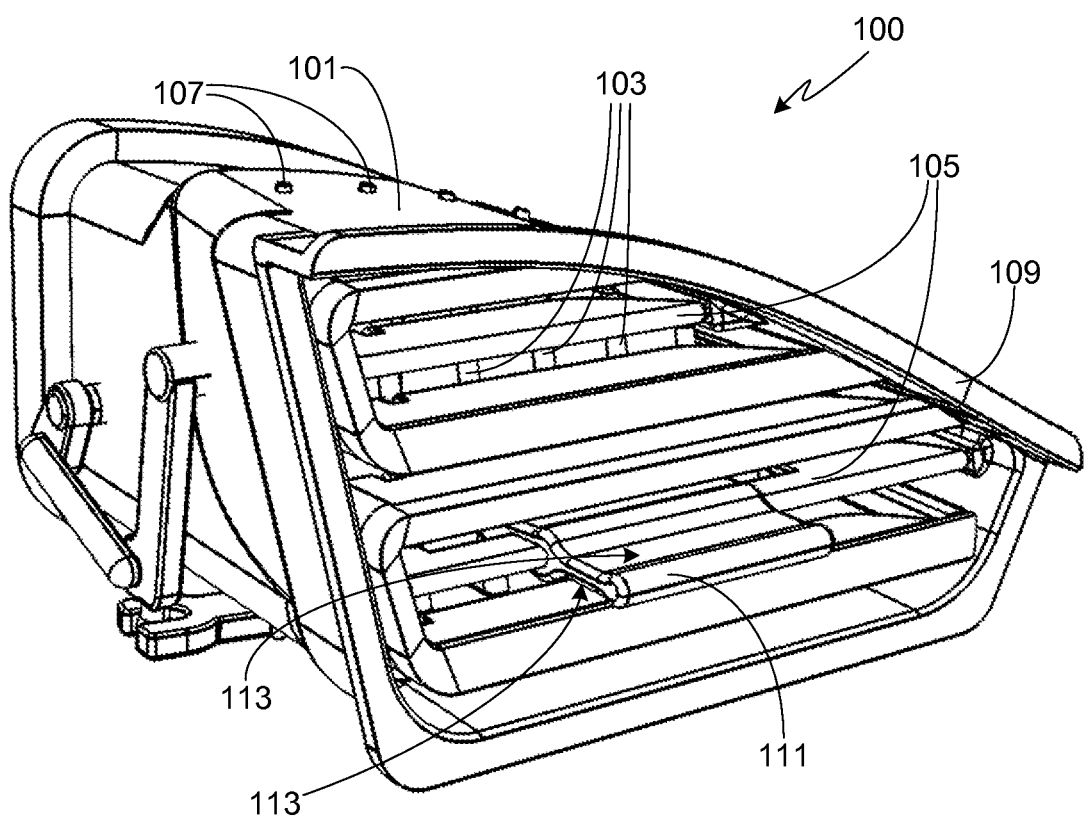
FIG. 1 provides a front perspective view of an air outlet vent in accordance with the invention.
Figure 2:
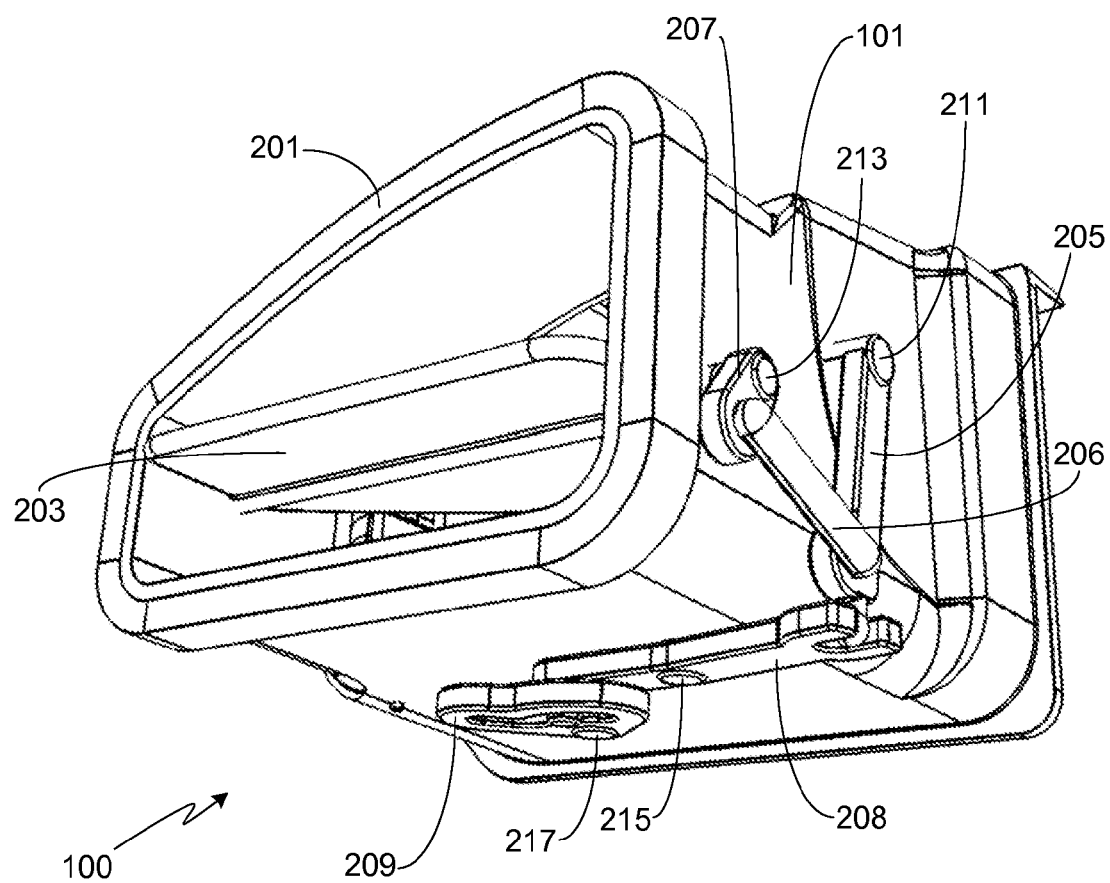
FIG. 2 provides a rear perspective view of the air outlet vent shown in FIG. 1.

FIG. 1 provides a front perspective view of an air outlet vent 100 configured for use with a heating, ventilation and cooling (HVAC) system such as those typically found in automobiles and other types of vehicles. FIG. 2 provides a rear perspective view of the same outlet vent. It will be appreciated that the invention is not limited to a specific vent size or shape, and that vent 100 is simply an exemplary air vent that illustrates operation of the air vent controller in accordance with the invention.

Housing 101 of air vent 100 as well as the air control vanes and at least some of the control linkage are preferably fabricated from plastic, thus simplifying fabrication and assembly while minimizing component weight and cost. Visible within the view of the vent assembly 100 provided by FIG. 1 are two sets of air control vanes 103 and 105. Preferably vanes 103 and 105 are orthogonal, or substantially orthogonal, to one another, thus providing the user with sufficient directional control of the air flowing out of the vent. In the illustrated embodiment, control vanes 103 are vertical vanes that pivot about vertical pivot axes 107, thus providing left/right air control. Similarly, control vanes 105 are horizontally positioned, each pivoting about a horizontal pivot axis to provide the user with up/down air control. The bulk of housing 101, including the control linkage described below, is designed to be recessed within the dash or other surface of the vehicle. As a result, only minimal air vent features, such as mounting flange 109, are visible to the end user from within the passenger cabin. Rear flange 201 is configured to be coupled to a HVAC duct, not shown, that provides air to the vent assembly.

Extending away from air vent assembly 100 is a control tab 111. Control tab 111 provides the user with a means for controlling the motion of the air control vanes 103/105 as well as air shut-off door 203. In the illustrated embodiment tab 111 is comprised of an elongated planar surface that includes upper and lower indents 113, thus providing the user with a convenient finger hold. It will be appreciated, however, that the control tab may utilize any of a variety of sizes and shapes in order to fit the design aesthetics of the vehicle in which the control vent assembly is to be used. For example, rather than the elongated planar tab shown in the figures, a cylindrical "knob" may be affixed to the air control vanes and linkage.

Figure 11:
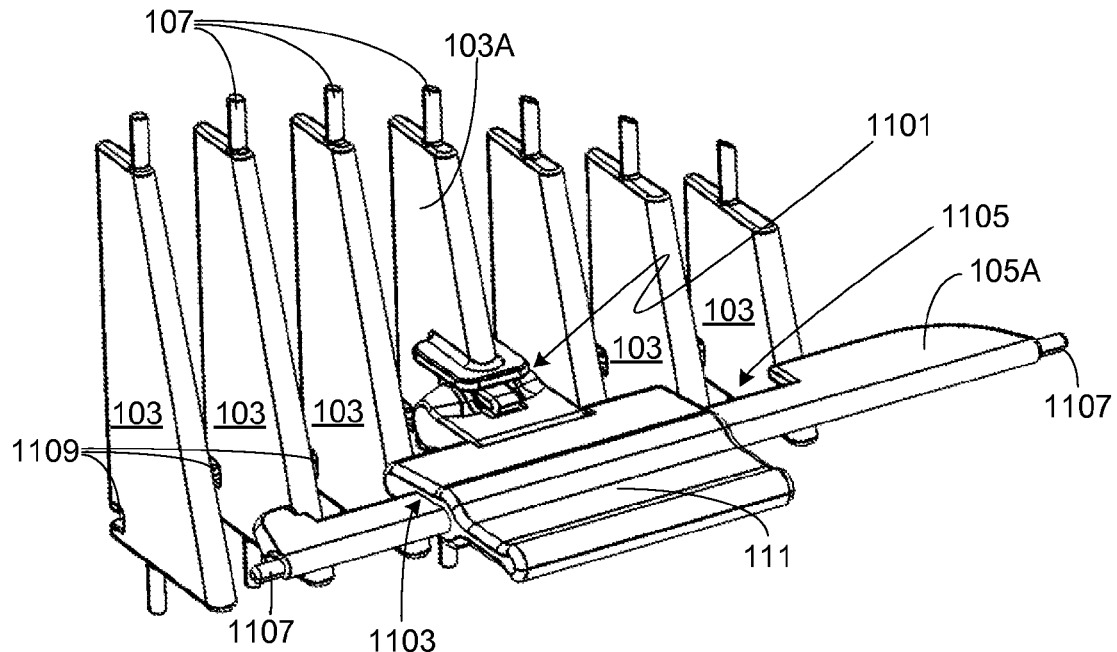
FIG. 11 illustrates the coupling between the control tab and the vertical air control vanes.
Figure 12:
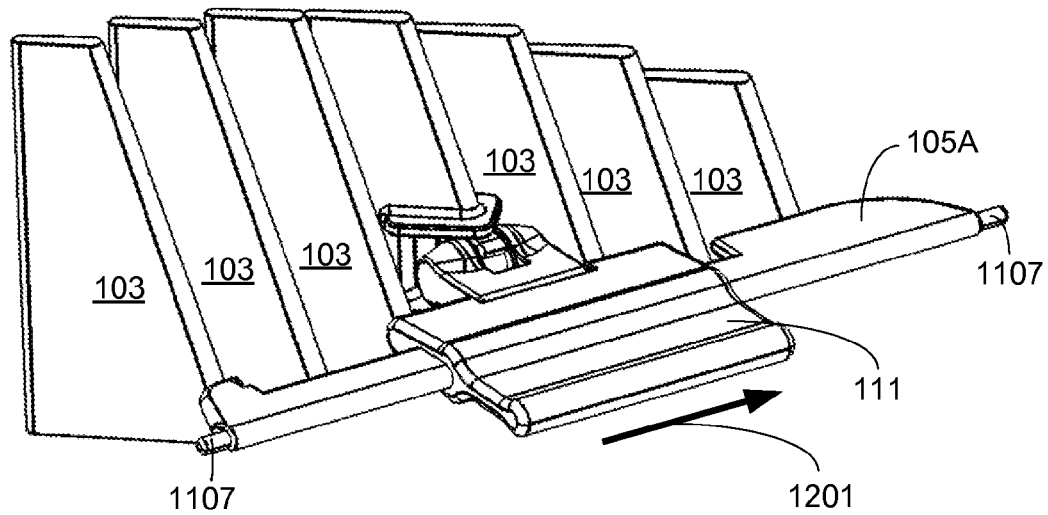
FIG. 12 provides a similar view to that of FIG. 11, except that the control tab has been translated to the right.
Figure 13:
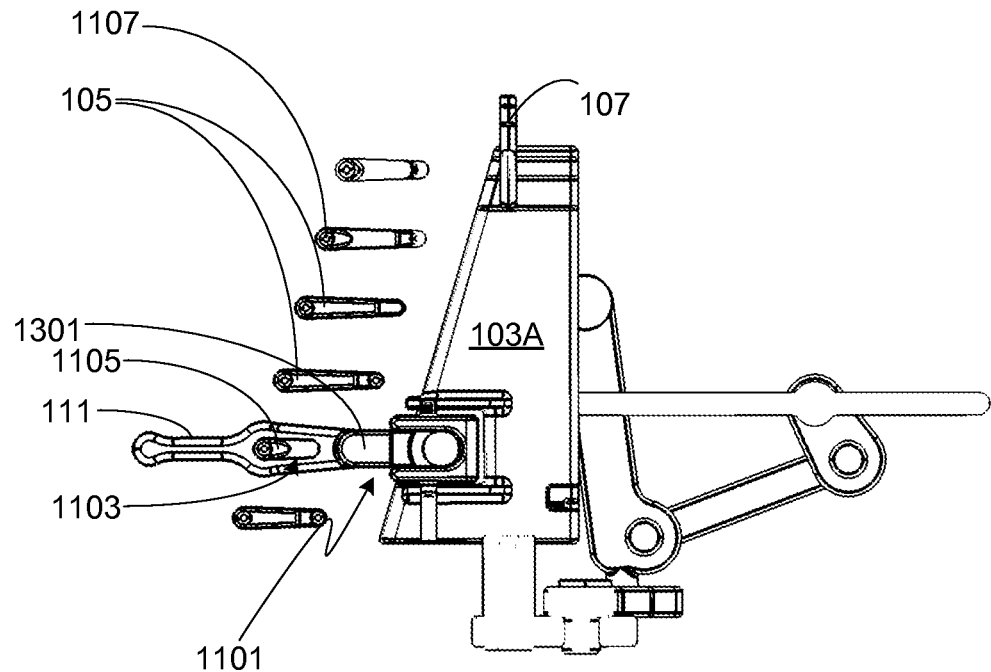
FIG. 13 illustrates the coupling between the control tab and the horizontal air control vanes.
Figure 14:
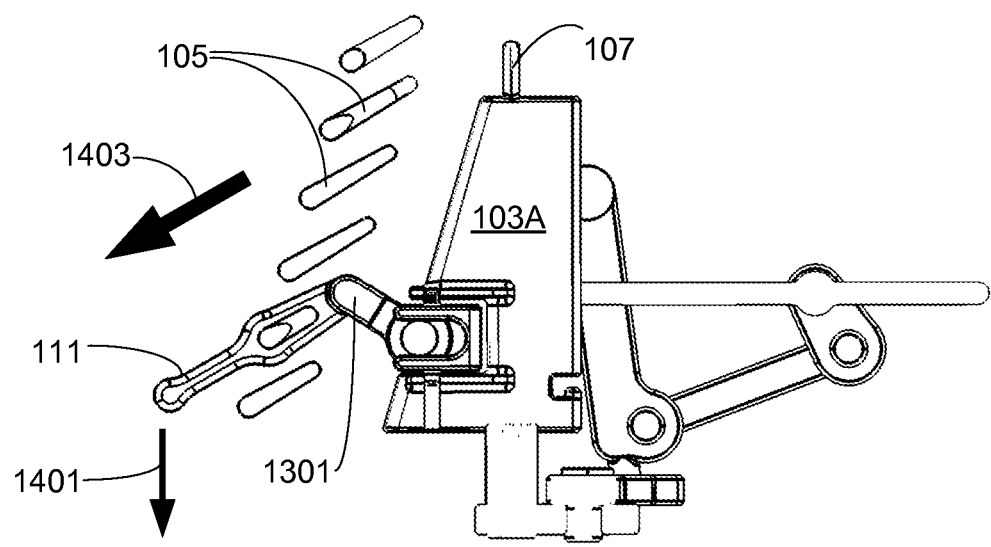
FIG. 14 provides a similar view to that of FIG. 13, except that the control tab has been translated downwards.
Figure 15:
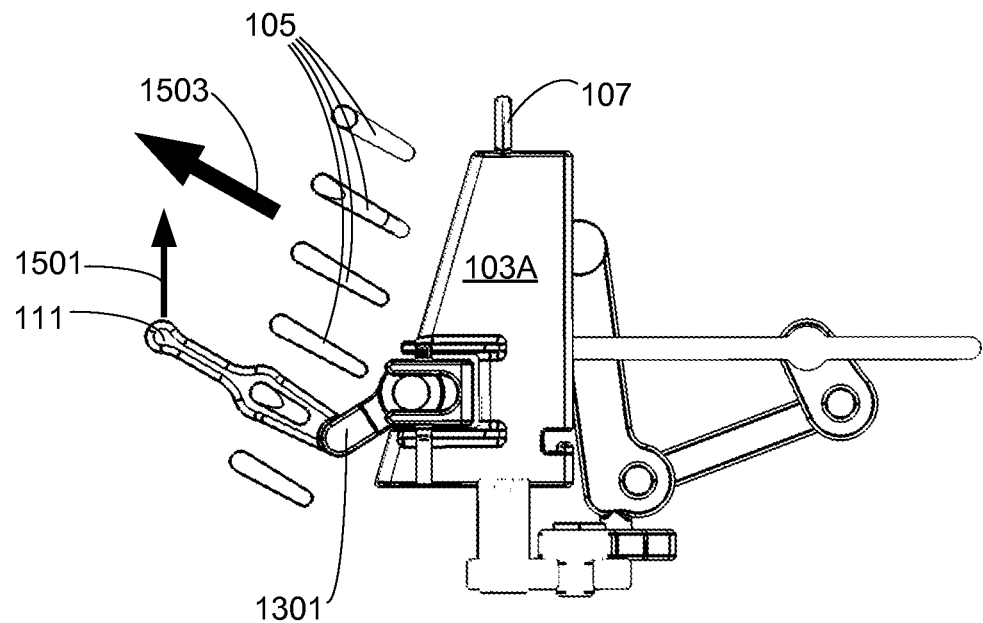
FIG. 15 provides a similar view to that of FIG. 13, except that the control tab has been translated upwards.

FIGS. 3-12 provide multiple views of air vent assembly 100, these views illustrating the use of a single controller, i.e., control tab 111, along with the disclosed control linkage to control left/right air flow direction via vertical control vanes 103 as well as overall control of air flow via shut-off door 203. FIGS. 13-15 illustrate the use of the same controller, i.e., control tab 111, to control up/down air flow direction via horizontal control vanes 105. As shown in FIG. 2 and the subsequent figures, the linkage assembly is comprised of four links 205-208 plus cam 209. Note that linkage arm 205 pivots about axis 211, linkage arm 207 pivots about axis 213, linkage arm 208 pivots about axis 215, and cam 209 pivots about axis 217.

Figure 3:
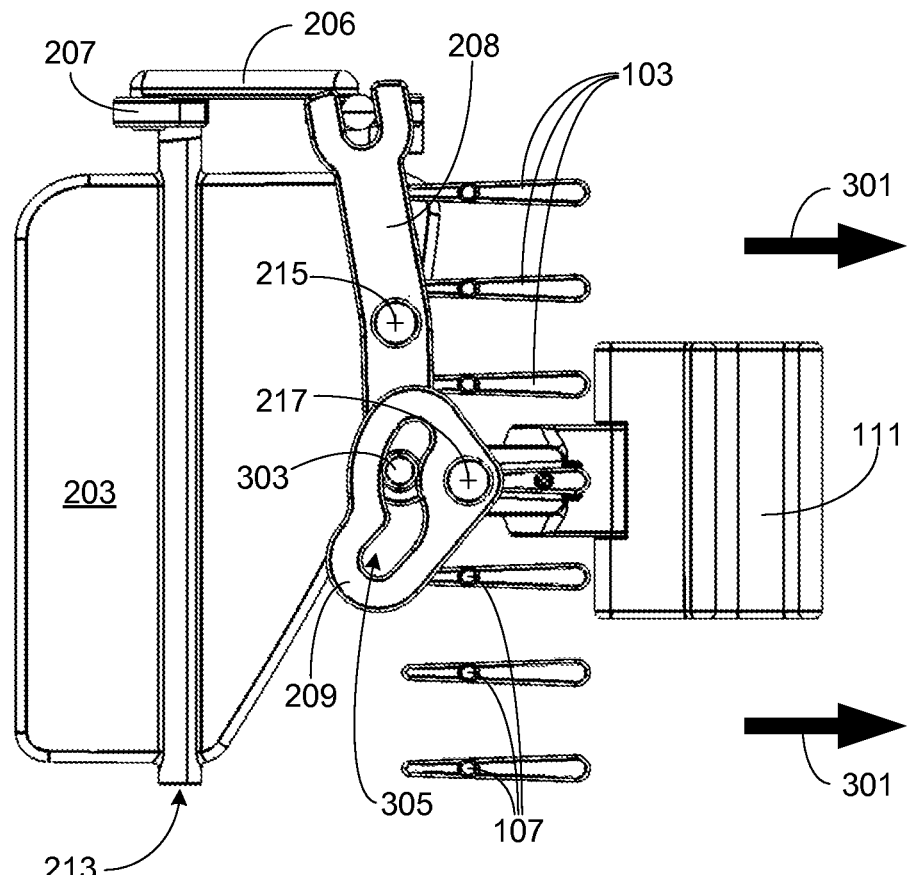
FIG. 3 provides a simplified bottom view of the air vent and control linkage assembly with the vertical air control vanes at 0 degrees rotation.
Figure 4:
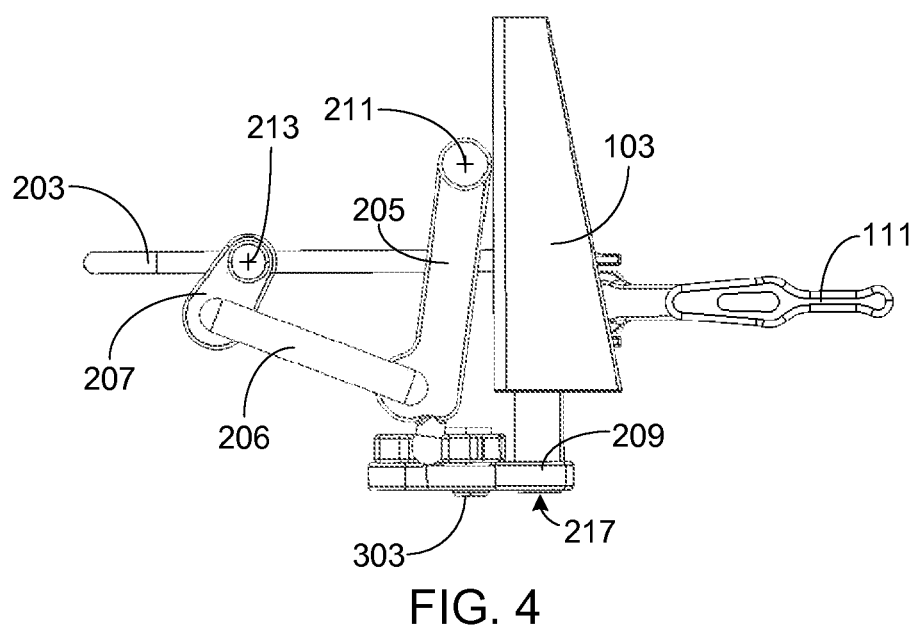
FIG. 4 provides a simplified side view of the air vent and control linkage assembly with the vertical air control vanes at 0 degrees rotation.

FIGS. 3 and 4 provide bottom and side views, respectively, of the control linkage assembly with air control vanes 103 at 0 degrees of rotation, thus allowing the air to flow straight out of the air vent following a pathway parallel to air flow path 301. Note that in these figures as well as many of the subsequent figures, a number of features have been removed in order to provide a clear view of the linkage assembly. For example, in FIGS. 3-9 the vent housing 101, the horizontal vanes 105, and the control arms that are used to couple together the vertical vanes 103 have been eliminated.

Located near the end of link 208, opposite the end coupled to link 205, is a pin 303. Pin 303 is captured within slot 305 of cam 209 as shown. Slot 305 is comprised of two regions. The first region is concentric about axis 217. In FIG. 3, pin 303 is shown centered in this concentric region of the slot. In the preferred embodiment, the concentric region of slot 305 extends approximately 30 degrees to either side of the center of this region of the slot, i.e., approximately 30 degrees to either side of the position of pin 303 shown in FIG. 3. It will be appreciated that although the total arc of this region of slot 305 is preferably on the order of 60 degrees, the arc may be larger (e.g., 70 degrees) or smaller (e.g., 50 degrees) as desired.

Figure 5:
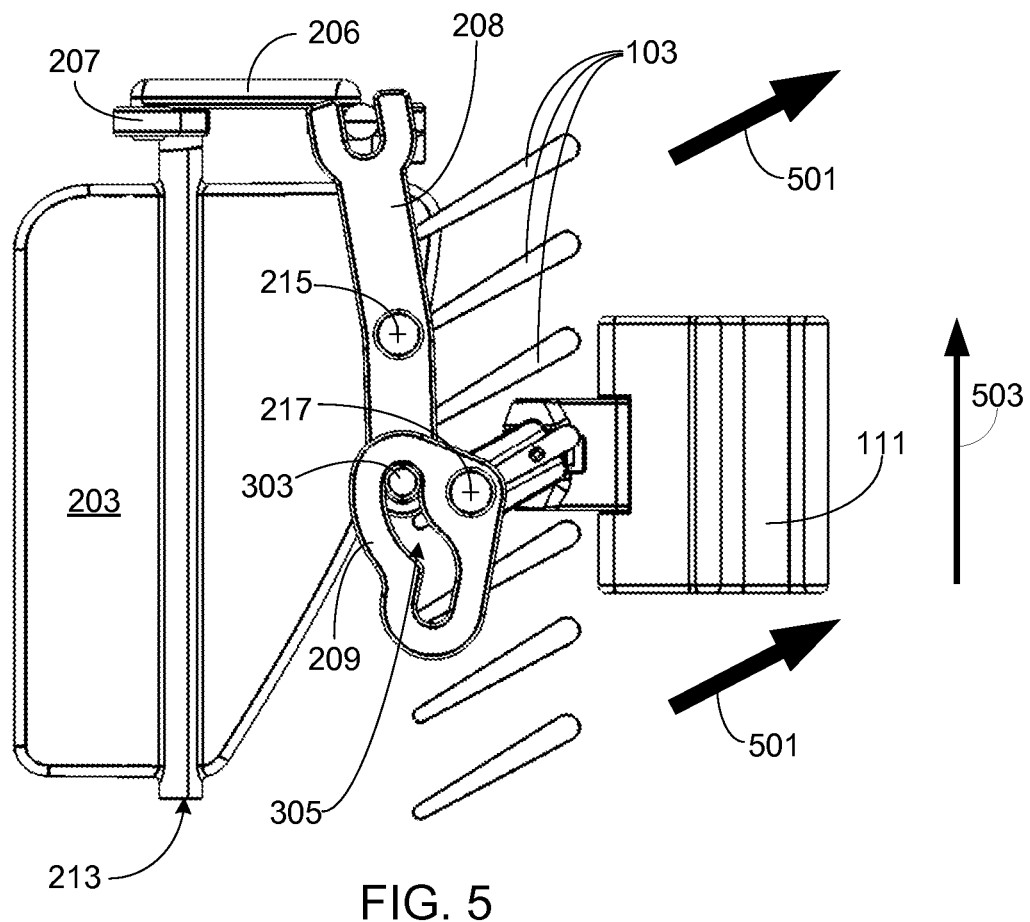
FIG. 5 provides a simplified bottom view of the air vent and control linkage assembly with the vertical air control vanes rotated approximately 30 degrees to a first side of the center position resulting in the air flow being directed to the right.
Figure 6:
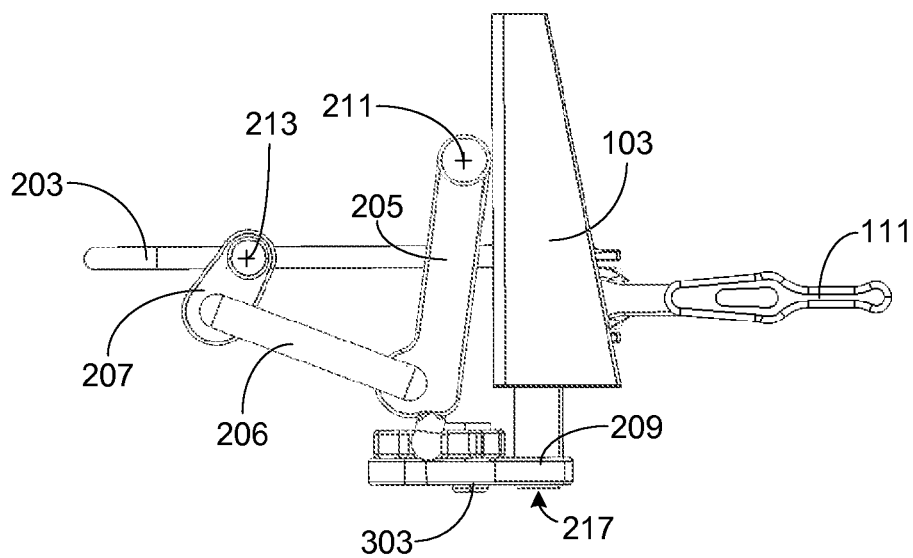
FIG. 6 provides a simplified side view of the air vent and control linkage assembly with the vertical air control vanes rotated approximately 30 degrees to a first side of the center position.
Figure 7:
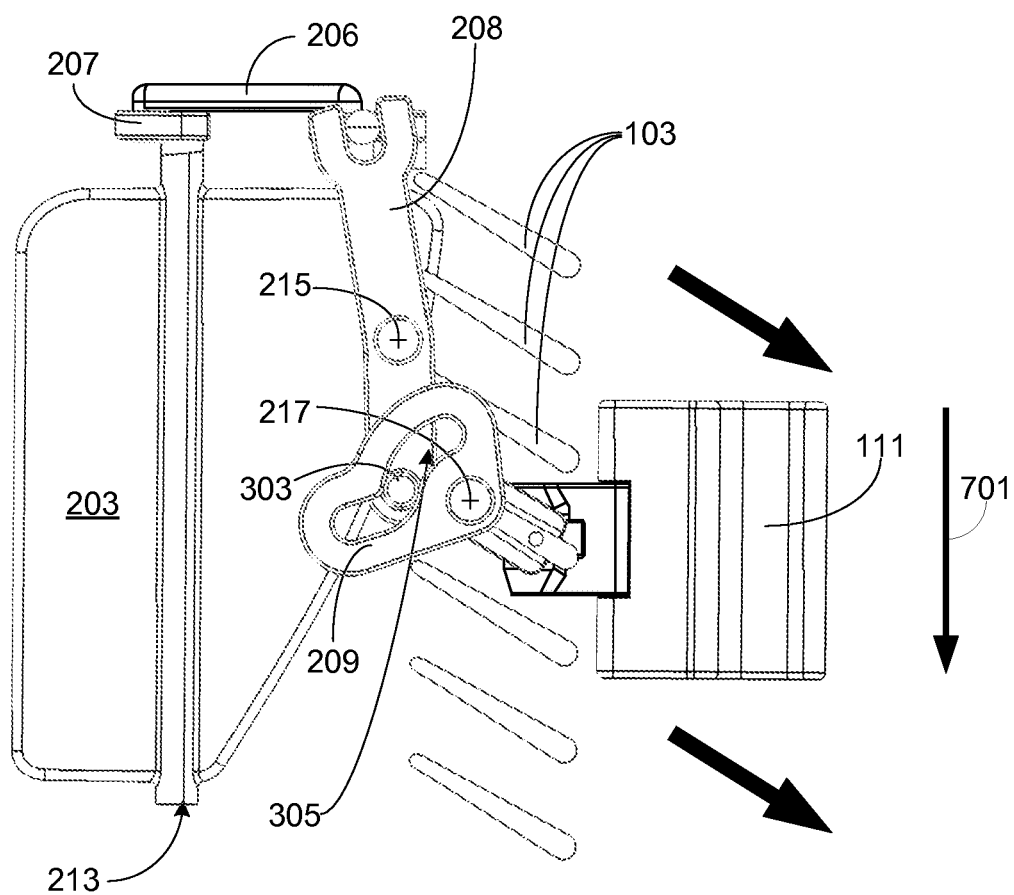
FIG. 7 provides a simplified bottom view of the air vent and control linkage assembly with the vertical air control vanes rotated approximately 30 degrees to a second side of the center position resulting in the air flow being directed to the left.

As a result of the concentric region of slot 305, control tab 111 is permitted limited movement from side to side while not affecting the location of pin 303. FIGS. 5-7 illustrate this motion. FIGS. 5 and 6 provide bottom and side views, respectively, of the control linkage assembly with air control vanes 103 at approximately 30 degrees of rotation, resulting in the air flowing out of the vent following a pathway parallel to air flow path 501. To achieve this re-direction of air flow, control tab 111 was moved to the left of the center position in a direction 503. Due to the concentric region of slot 305, the location of pin 303 remains unchanged. Note that FIG. 6, which provides a side view of the assembly, is identical to FIG. 4 except for the rotation of cam 209. As a result, the position of shut-off door 203, and thus air flow, remains unchanged during ordinary air flow control. Also note that a leftward movement of control tab 111, as perceived by a passenger within the passenger cabin, corresponds to an upward movement 503 in FIG. 5. It will be understood that due to the concentric region of slot 305 on either side of the central location (shown in FIG. 3), control tab 111 may also be moved to the right of the central position, causing the opposite effect on control vanes 103. This is illustrated in FIG. 7 in which control tab 111 has been moved to the right, corresponding to a downward movement 701 as viewed from the bottom of the vent outlet.

Figure 8:
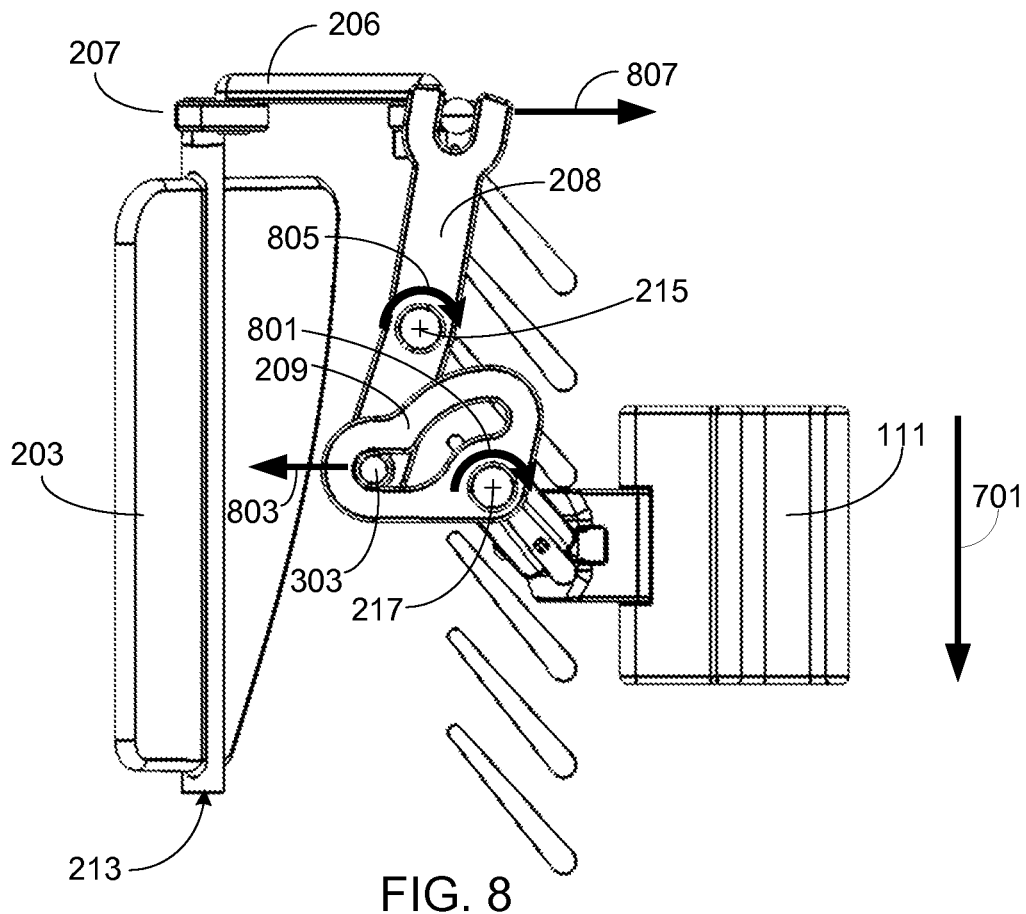
FIG. 8 provides a simplified bottom view of the air vent and control linkage assembly with the vertical air control vanes rotated approximately 50 degrees to the second side of the center position resulting in rotation of the shut-off door to the closed position.
Figure 9:
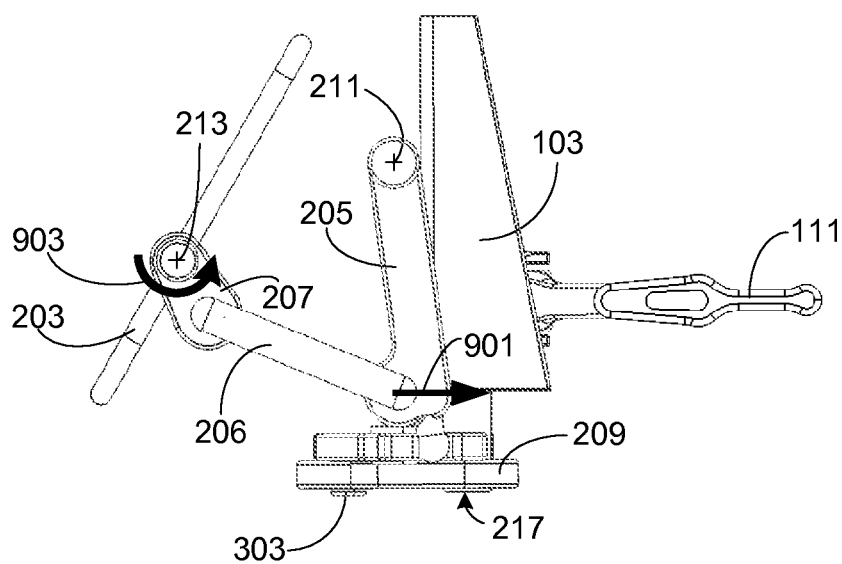
FIG. 9 provides a simplified side view of the air vent and control linkage assembly with the vertical air control vanes rotated approximately 50 degrees to the second side of the center position.

As shown in the bottom and side views of FIGS. 8 and 9, respectively, if control tab 111 is moved further to the right than shown in FIG. 7, cam 209 continues to rotate in a direction 801 causing pin 303 to eventually pass out of the concentric portion of slot 305 and move in a direction 803 in the second, non-concentric portion of slot 305. Movement of pin 303 in direction 803 causes link 208 to pivot about axis 215 in a direction 805 and the distal end portion of link 208 opposite pin 303 to move in a direction 807. As the distal end of link 208 moves in direction 807, link 206 moves in a direction 901 which, in turn, causes link 207 to rotate in a direction 903 about axis 213. Shut-off door 203 is fixed to link 207 at axis 213. As a result, rotating link 207 in direction 903 causes the rotation of door 203, thereby sealing off the entrance duct of outlet vent 100.

Figure 10:
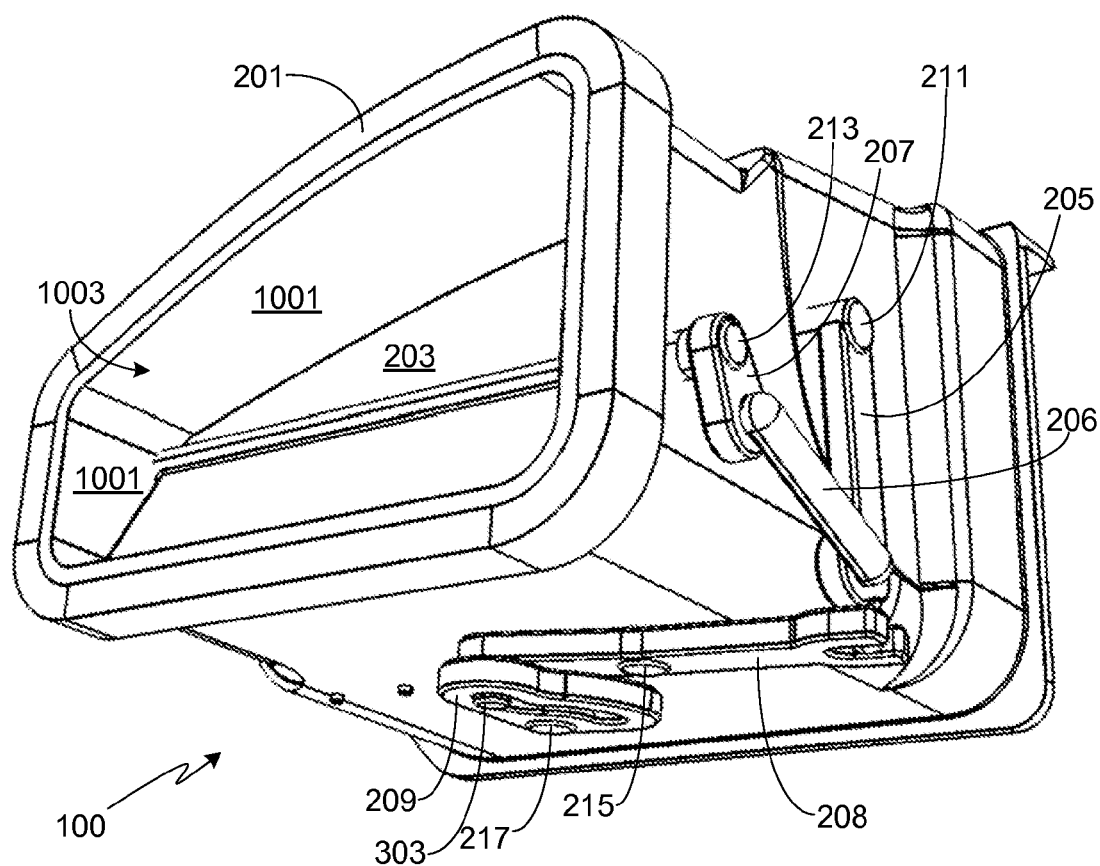
FIG. 10 provides a rear perspective view of the air outlet vent shown in FIG. 2, with the shut-off door in the closed position.

FIG. 10 provides a rear perspective view of outlet vent 100 similar to that shown in FIG. 2, except that shut-off door 203 is in the closed position. Preferably in the closed position, the edge of door 203 abuts and seals against the inner surfaces 1001 of the entrance portion 1003 of vent 100 as shown, thus sealing against air flow through vent 100.

Controller tab 111 controls the motion of air control vanes 103 and 105 in a similar manner to that used in a variety of conventional vent outlets. Preferably and as illustrated in FIG. 11, control tab 111 is fixed to one of the vertical air control vanes 103, more specifically primary vertical vane 103A, with a flexible joint assembly 1101 that allows tab 111 to pivot from side to side and up/down relative to vane 103A. In the preferred and illustrated embodiment, control tab 111 includes an inner slot 1103 that permits the tab to slide from side to side over a necked down portion 1105 of primary horizontal vane 105A. For example, in FIG. 12 tab 111 has been moved toward the right in a direction 1201. As shown, during this movement control tab 111 has slid along the length of horizontal vane 105A. FIGS. 11 and 12 also show the pivot axis 1107 of the illustrated horizontal vane 105A as well as a control rod 1109 that couples vanes 103, including vane 103A, together. As a result of the control rod, movement of one of the vertical vanes, e.g., vane 103A, causes all of the vertical vanes to move in unison thereby allowing side to side directional control of air flow through outlet vent 100.

FIGS. 13-15 provide a side, cross-sectional view of control tab 111, joint assembly 1101, and horizontal vanes 105. Note that in the preferred embodiment, joint assembly 1101 includes a pivotal link 1301 that is coupled to control tab 111. As with the vertical vanes, horizontal vanes 105 are coupled together via a control rod, not visible in this figure, which causes the horizontal vanes 105 to move in unison. Thus, for example, when the leading edge of the control tab 111 is moved in a downwards direction 1401, the interconnected horizontal vanes 105 redirect air flow in a downwards direction 1403. Similarly, when the leading edge of the control tab 111 is moved in an upwards direction 1501, the interconnected horizontal vanes 105 redirect air flow in an upwards direction 1503.

Figure 16:
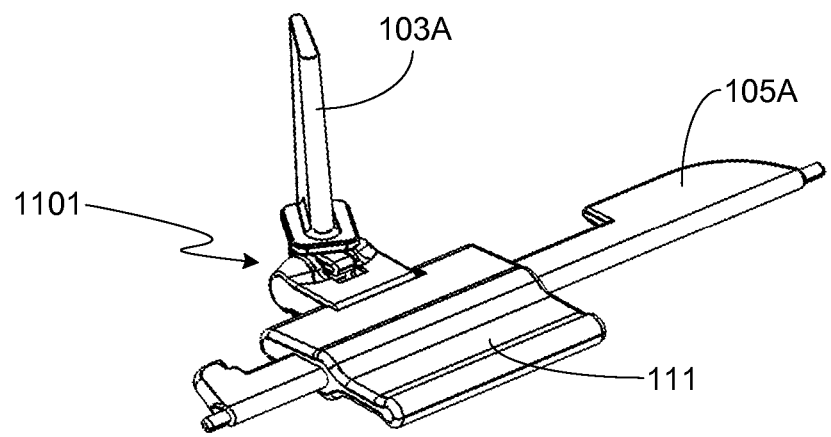
FIG. 16 provides a detailed view of the flexible coupling between the control tab and the primary vertical and horizontal air control vanes.
Figure 17:
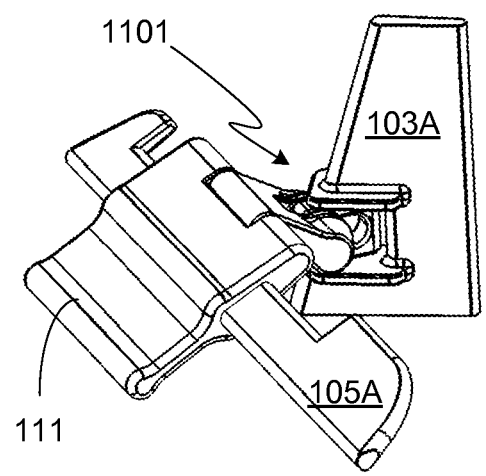
FIG. 17 provides an alternate view of the flexible coupling between the control tab and the primary vertical and horizontal air control vanes.

FIGS. 16 and 17 provide detailed perspective views of joint assembly 1101, control tab 111, primary vertical control vane 103A and primary horizontal control vane 105A.

It should be understood that identical element symbols used on multiple figures refer to the same component, or components of equal functionality. Additionally, the accompanying figures are only meant to illustrate, not limit, the scope of the invention and should not be considered to be to scale. Note that the terms "air vent", "air outlet", "vent", "outlet" and "air outlet vent" are used interchangeably throughout the specification to refer to a HVAC air vent such as those found in a car or other type of vehicle in general, and the HVAC air vent of the invention in particular.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A vehicle air vent, comprising:
a housing having a flange that forms an air flow opening;
a plurality of air control vanes mounted within said housing, wherein each of said plurality of air control vanes may be pivoted about a corresponding axis, and wherein an orientation of said plurality of air control vanes determines a direction of air flow exiting said vehicle air vent;
a shut-off door mounted within said housing, wherein said shut-off door is separate from said plurality of air control vanes, wherein said shut-off door has at least a first position and a second position, wherein said shut-off door in said first position allows air flow through said vehicle air vent, and wherein said shut-off door in said second position blocks air flow through said vehicle air vent;
a control tab mechanically coupled to said plurality of air control vanes, wherein the control tab is positioned in the air flow opening within the flange; and
a linkage assembly mechanically coupling said control tab to said shut-off door, wherein said shut-off door remains within said first position when said control tab is adjusted within a first range of positions, wherein adjustment of said control tab within said first range of positions alters said orientation of said plurality of air control vanes, and wherein said shut-off door moves between said first and second positions when said control tab is adjusted within a second range of positions.

2. The vehicle air vent of claim 1, said plurality of air control vanes comprising a plurality of horizontal air control vanes and a plurality of vertical air control vanes, wherein an orientation of said plurality of horizontal air control vanes determines an up/down direction of air flow exiting said vehicle air vent, and wherein an orientation of said plurality of vertical air control vanes determines a left/right direction of air flow exiting said vehicle air vent.

3. The vehicle air vent of claim 2, wherein said control tab may be adjusted from side to side, wherein said shut-off door remains within said first position when said control tab is adjusted from side to side within said first range of positions, and wherein said orientation of said plurality of vertical air control vanes is varied between a leftward orientation and a rightward orientation as said control tab is adjusted from a left side to a right side within said first range of positions.

4. The vehicle air vent of claim 3, wherein said shut-off door moves between said first and second positions as said control tab is adjusted from side to side within said second range of positions.

5. The vehicle air vent of claim 2, wherein said control tab may be adjusted upwards and downwards from a central position, wherein said shut-off door remains within said first position when said control tab is adjusted upwards and downwards as long as said control tab remains within said first range of positions, and wherein said orientation of said plurality of horizontal air control vanes is varied between an upward orientation and a downward orientation as said control tab is adjusted from an upward position to a downward position.

6. The vehicle air vent of claim 2, further comprising a first control rod coupling said plurality of horizontal air control vanes together such that said plurality of horizontal air control vanes move in unison, and a second control rod coupling said plurality of vertical air control vanes together such that said plurality of vertical air control vanes move in unison.

7. The vehicle air vent of claim 6, further comprising a flexible joint assembly coupling said control tab to a front portion of a primary vertical air control vane.

8. The vehicle air vent of claim 7, said control tab further comprising a slot, said slot configured to slide over a portion of a primary horizontal air control vane.

9. The vehicle air vent of claim 1, said linkage assembly comprising a cam, said cam comprising a slot, wherein a first portion of said slot is concentric about a cam rotation axis, and wherein a second portion of said slot is not concentric about said cam rotation axis.

10. The vehicle air vent of claim 9, said linkage assembly further comprising a first link, said first link comprising a pin captured within said slot of said cam, wherein said first link is coupled to said shut-off door via at least a second link and a third link, wherein rotation of said third link about a third link pivot axis causes said shut-off door to move between said first and second positions.

11. The vehicle air vent of claim 10, wherein during adjustment of said control tab within said first range of positions said pin remains within said first portion of said slot and said third link does not rotate about said third link pivot axis, and wherein during adjustment of said control tab within said second range of positions said pin moves within said second portion of said slot and said third link rotates about said third link pivot axis.

12. The vehicle air vent of claim 10, wherein during adjustment of said control tab within said first range of positions said cam rotates about said cam rotation axis within a first range of rotation and said pin remains within said first portion of said slot and said third link does not rotate about said third link pivot axis, and wherein during adjustment of said control tab within said second range of positions said cam rotates about said cam rotation axis within a second range of rotation and said pin moves within said second portion of said slot and said third link rotates about said third link pivot axis.

13. The vehicle air vent of claim 1, wherein an entrance duct of said housing of said vehicle air vent is coupled to a heating, ventilation and cooling (HVAC) system, and wherein an exit duct of said housing of said vehicle air vent is coupled to a vehicle passenger cabin.

14. The vehicle air vent of claim 1, wherein said control tab has a planar, elongated form.

15. The vehicle air vent of claim 1, wherein said control tab has a knob-like form.

16. A vehicle air vent, comprising:
a housing;
a plurality of air control vanes mounted within said housing including at least one horizontal air control vane, wherein each of said plurality of air control vanes may be pivoted about a corresponding axis, and wherein an orientation of said plurality of air control vanes determines a direction of air flow exiting said vehicle air vent;
a shut-off door mounted within said housing, wherein said shut-off door is separate from said plurality of air control vanes, wherein said shut-off door has at least a first position and a second position, wherein said shut-off door in said first position allows air flow through said vehicle air vent, and wherein said shut-off door in said second position blocks air flow through said vehicle air vent;
a control tab mechanically coupled to said plurality of air control vanes, said control tab further comprising a slot, said slot configured to slide over a portion of the horizontal air control vane; and
a linkage assembly mechanically coupling said control tab to said shut-off door, wherein said shut-off door remains within said first position when said control tab is adjusted within a first range of positions, wherein adjustment of said control tab within said first range of positions alters said orientation of said plurality of air control vanes, and wherein said shut-off door moves between said first and second positions when said control tab is adjusted within a second range of positions.

17. The vehicle air vent of claim 16, wherein said control tab may be adjusted from side to side, wherein said shut-off door remains within said first position when said control tab is adjusted from side to side within said first range of positions, and wherein said orientation of said plurality of vertical air control vanes is varied between a leftward orientation and a rightward orientation as said control tab is adjusted from a left side to a right side within said first range of positions.

18. The vehicle air vent of claim 17, wherein said shut-off door moves between said first and second positions as said control tab is adjusted from side to side within said second range of positions.

19. A vehicle air vent, comprising:
a housing;
a plurality of air control vanes mounted within said housing, wherein each of said plurality of air control vanes may be pivoted about a corresponding axis, and wherein an orientation of said plurality of air control vanes determines a direction of air flow exiting said vehicle air vent, said plurality of air control vanes comprising a plurality of horizontal air control vanes and a plurality of vertical air control vanes, wherein an orientation of said plurality of horizontal air control vanes determines an up/down direction of air flow exiting said vehicle air vent, and wherein an orientation of said plurality of vertical air control vanes determines a left/right direction of air flow exiting said vehicle air vent;
a shut-off door mounted within said housing, wherein said shut-off door is separate from said plurality of air control vanes, wherein said shut-off door has at least a first position and a second position, wherein said shut-off door in said first position allows air flow through said vehicle air vent, and wherein said shut-off door in said second position blocks air flow through said vehicle air vent;
a control tab mechanically coupled to said plurality of air control vanes, said control tab further comprising a slot, said slot configured to slide over a portion of a primary horizontal air control vane;
a linkage assembly mechanically coupling said control tab to said shut-off door, wherein said shut-off door remains within said first position when said control tab is adjusted within a first range of positions, wherein adjustment of said control tab within said first range of positions alters said orientation of said plurality of air control vanes, and wherein said shut-off door moves between said first and second positions when said control tab is adjusted within a second range of positions;

a first control rod coupling said plurality of horizontal air control vanes together such that said plurality of horizontal air control vanes move in unison, and a second control rod coupling said plurality of vertical air control vanes together such that said plurality of vertical air control vanes move in unison; and a flexible joint assembly coupling said control tab to the primary vertical air control vane.

20. The vehicle air vent of claim 19, wherein said control tab may be adjusted from side to side, wherein said shut-off door remains within said first position when said control tab is adjusted from side to side within said first range of positions, and wherein said orientation of said plurality of vertical air control vanes is varied between a leftward orientation and a rightward orientation as said control tab is adjusted from a left side to a right side within said first range of positions.

21. The vehicle air vent of claim 20, wherein said shut-off door moves between said first and second positions as said control tab is adjusted from side to side within said second range of positions.

* * * * *